No. 736,425. PATENTED AUG. 18, 1903.
J. A. McCUTCHEN.
SEED PLANTER AND FERTILIZER DISTRIBUTER.
APPLICATION FILED JUNE 2, 1903.
NO MODEL. 2 SHEETS—SHEET 1.
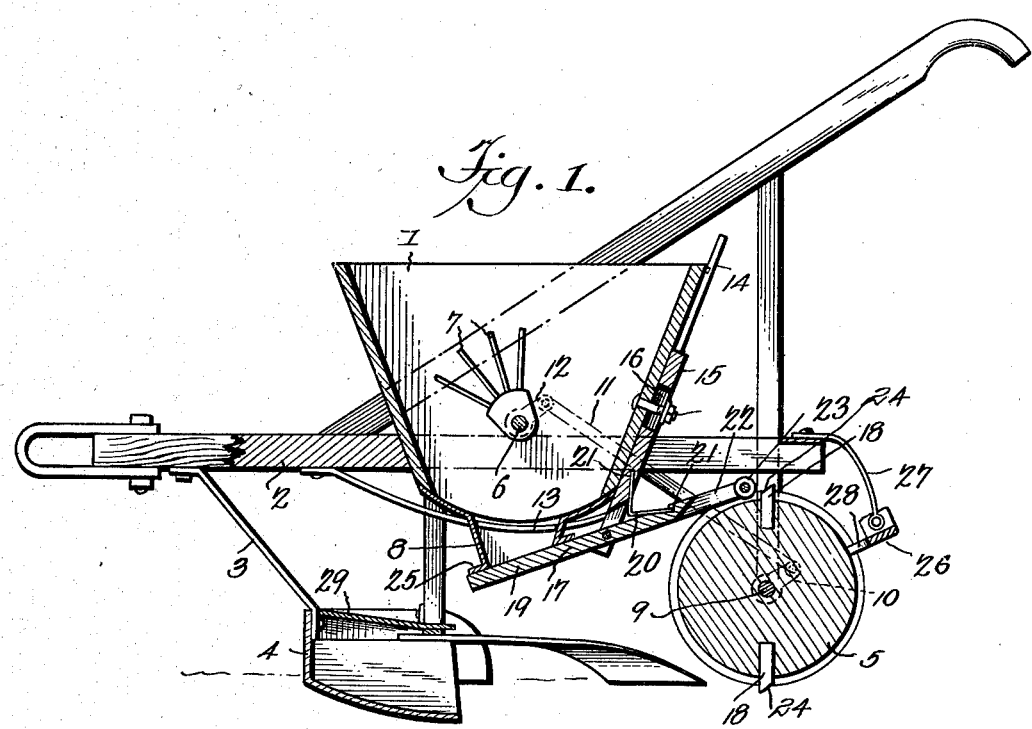
Fig. 1.
Fig. 3. Fig. 6.
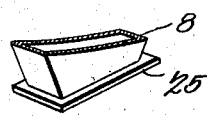
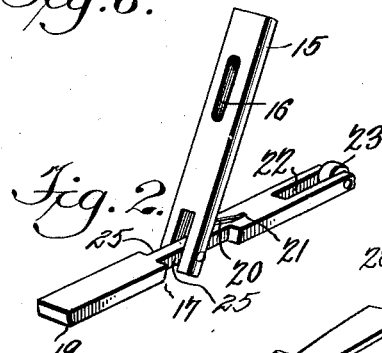
Fig. 2.
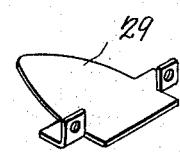
Fig. 5.
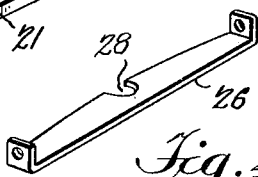
Fig. 4.
Witnesses
E. F. Stewart
Wm. Bagger
John A. McCutchen, Inventor,
by C. A. Snow & Co.
Attorneys No. 736,425. PATENTED AUG. 18, 1903.
J. A. McCUTCHEN.
SEED PLANTER AND FERTILIZER DISTRIBUTER.
APPLICATION FILED JUNE 2, 1903.
NO MODEL. 2 SHEETS—SHEET 2.
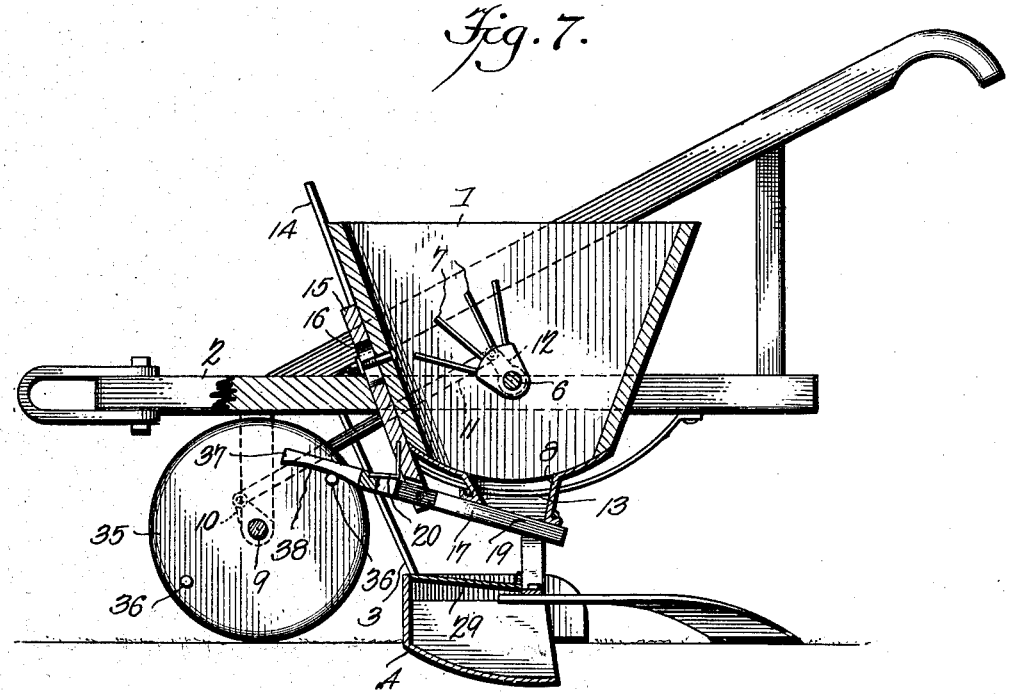
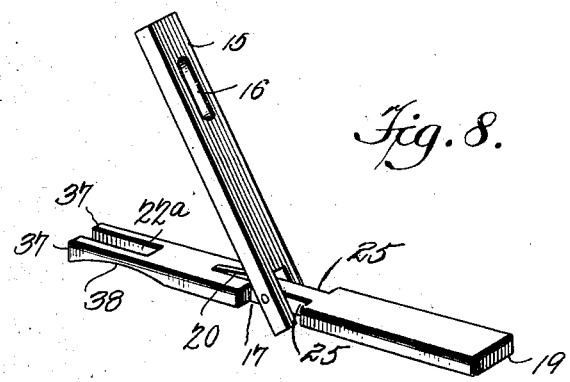
Witnesses
E. H. Stewart
Wm. Ragger
John A. McCutchen, Inventor
by C. A. Snow & Co.
Attorneys No. 736,425. Patented August 18, 1903.

UNITED STATES PATENT OFFICE.

JOHN A. McCUTCHEN, OF HERIOT, SOUTH CAROLINA.

SEED-PLANTER AND FERTILIZER-DISTRIBUTER.

SPECIFICATION forming part of Letters Patent No. 736,425, dated August 18, 1903.

Application filed June 2, 1903. Serial No. 159,754. (No model.)

*To all whom it may concern:*

Be it known that I, JOHN A. MCCUTCHEN, a citizen of the United States, residing at Heriot, in the county of Sumter and State of South Carolina, have invented a new and useful Seed-Planter and Fertilizer-Distributer, of which the following is a specification.

This invention relates to seed-planters and fertilizer-distributers of that class in which a hopper mounted in a suitable frame is provided with an oscillating shaft having fingers for the purpose of agitating the contents of the hopper, which is permitted to escape through a spout in the lower part of the hopper, oscillatory motion being imparted to the shaft from a rotary element of the machine.

My present invention has for its object to provide an attachment for machines of this class whereby the discharge from the spout may be gaged or regulated and whereby the discharge instead of being continuous shall be made intermittent.

A further object of my invention is to provide an attachment of this class which may be appended to almost any planter or fertilizer-distributer of the class referred to without necessitating change of the general construction of the same.

A further object of my invention is to provide an attachment of the kind mentioned which shall be simple in construction and efficient in operation and which may be readily interchangeable from one machine to another.

With these and other objects in view my invention consists in the improved construction, arrangement, and combination of parts, which will be hereinafter fully described, and particularly pointed out in the claims.

In the accompanying drawings, Figure 1 is a sectional elevation of a planter equipped with my improved attachment. Fig. 2 is a perspective view of the device constituting my invention detached from the planter. Fig. 3 is a perspective detail view of the hopper-spout used in connection with my invention. Fig. 4 is a perspective detail view of the scraper used in connection with the covering-roller. Fig. 5 is a detail perspective of a shield used in connection with the furrow-opener. Fig. 6 is a detail view of a modification. Fig. 7 is a sectional elevation showing my invention applied to planters of that type which are provided with a traction-wheel disposed in front of the hopper. Fig. 8 is a perspective detail view illustrating the modified form of the attachment applied to the planter shown in Fig. 7.

Corresponding parts in the several figures are indicated by similar numerals of reference.

A hopper (designated 1) is supported upon a frame 2, provided with a downward-extending standard 3, carrying a plow or furrow-opener 4. Brackets are also provided carrying a covering-roller 5, and a shaft 6, journaled transversely in the hopper, is provided with a plurality of radiating fingers 7 for the purpose of agitating the contents of the hopper to cause it to escape through the spout 8. The shaft 9 of the covering-roller is provided with a crank 10, connected by a pitman 11 with a crank 12 upon a projecting end of the shaft 6 in the hopper, thereby transmitting an oscillatory motion to said shaft. A gage-slide 13 may be provided in the bottom of the hopper, and a lever 14 may be provided for the adjustment of said slide. (This structure constitutes an ordinary seed-dropper or fertilizer-distributer of a type or pattern which is now largely used; but it has been herein shown simply as an example of a device to which my improved attachment may be connected for operation, it being understood that I reserve the right of applying my improvement to any of the numerous planters or fertilizer-distributers which are now in the market and which will admit of the application thereto and of the use in connection therewith of my said improvement.) The latter comprises a bracket 15, having a longitudinal slot 16, whereby it may be connected, by means of one or more bolts, with one of the ends of the hopper. In the example illustrated in Fig. 1 this bracket is attached to the rear side of the hopper in order that a lever 17, pivotally mounted in the lower bifurcated end of said bracket, may be extended in the path of the revoluble element of the device, which in this instance consists of the covering-roller. In the event, however, of my improvement being attached to a planter which is not provided with a covering-roller the said attachment will be so constructed that the lever or an arm connected therewith may be extended in the path of some rotary element, such as will be presently hereinafter described.

The lower end of the spout 8 of the hopper is cut off obliquely, so that one end of the lever 17 may be extended underneath said hopper and normally form a closure for the same and also to permit the seeds to drop out more readily. The lever is thereby caused to occupy an inclined position, and its outer upwardly-inclined end will be caused to lie in the path of the rotary element in front or in rear of the hopper, as the case may be. In the accompanying drawings, Fig. 1, the upper end of said lever is shown as extended in the path of the covering-roller 5, which has been shown as provided with a plurality of tappets 18, which when the roller revolves will successively engage the upper end of the lever, thereby causing its lower end, which forms the closure 19, to be removed or depressed downwardly from the spout, thereby enabling a portion of the contents of the latter to escape. The upper end of the lever may be sufficiently heavy to overbalance the lower part which forms the closure, so that when the tappets pass out of engagement with the lever the lower end of the spout will be automatically closed by the weight thereof. Instead, however, of altogether relying upon the weight of the upper end of the lever to effect the closure of the discharge end of the spout at the proper time I prefer to avail myself of a U-shaped spring, as 20, which is inserted between the bracket 15 and the upper end of the lever, the ends of said spring being sprung into sockets 21, prepared for its reception in the said bracket and lever, said sockets being simply in the form of inclined mortises. By this spring the closure of the lower or discharge end of the spout will be effected at the proper time very quickly and with a snap which will serve to agitate the contents of the spout and to some extent that of the seedbox, whereby the seed or fertilizing material that is to be dropped will drop down upon the lower end of the lever which forms the closure 19, so that at the next operation of the lever a sufficient quantity to form a charge will be in position to escape from the spout.

In order to enable the lever 17 to be successfully operated, I prefer to form at the upper or rear end thereof a slot 22, in which is seated a roller 23 to be actuated by the tappets 18. The latter consist simply of pegs driven into the covering-roller 5 radially to the latter and provided with beveled outer edges 24, which will readily engage the roller 23, and thus impart to the operating-lever the quick snappy motion desired therefor.

It will be observed that during the operation of the device the lower edge of the spout 8 of the hopper will be exposed to a rapid succession of blows by the lever 17, which forms the closure for the lower end of said spout. The latter is usually manufactured of sheet metal and unless in some way protected would soon wear out. In order to avoid this, I provide the lower edge of the hopper with an outturned flange 25, which will receive the blows of the lever and which will protect the discharge end of the spout from injury, thereby greatly increasing the life of the invention.

Machines of the class herein described are usually provided with scrapers for the covering-rollers, such as indicated at 26, which represents the scrapers suitably mounted upon springs 27, so as to bear against the surface of the covering-roller and free the latter from adhering dirt. In order to provide for the passage of the tappets 18, this scraper is provided with a centrally-disposed notch 28, through which the tappets may pass without interference.

In order to prevent the seeds or fertilizing material discharged from the hopper from becoming deposited upon the shoe of the furrow-opener, I prefer to provide the latter with a shield, (designated 29,) which will deflect any material dropped thereon into the furrow, as will be readily understood.

In Fig. 6 of the drawings I have illustrated a modification in the construction of the lever 17, whereby the engagement therewith of the tappets 18 shall cause it to be retained in an open position for a certain predetermined period, thereby causing the period of dropping to be regulated, and consequently forming a hill or stand of any desired length or extent. By this modification I simply omit the roller 23 at the outer end of said lever 17 and form its outer or upper end with a curvature 30, which will be engaged by the tappets 18, as will be readily understood. In the under side of the lever I form a recess 31, which may be of any desired length and which terminates at its upper edge in a shoulder 32. It is obvious that the distance between the shoulder 32 and the curved end 30 will determine the length of time during which the lever will be held in an open position by engagement therewith of the tappets. Consequently by increasing the length of the recess 31 the distance between said shoulder and the curved end of the lever will be decreased and the period of dropping will be correspondingly increased. Conversely, by decreasing the length of the recess 31 the period of dropping will be lengthened. These levers being usually constructed of wood are easily and cheaply manufactured, and a stock of them, with recesses 31 of various lengths, may be readily kept on hand, one lever being easily substituted for another by simply removing the pivotal pin.

In Fig. 7 of the drawings I have illustrated my invention applied to one of that class of planters which are provided with a traction-wheel disposed in front of the seed-hopper and in which the covering-roller shown in Fig. 1 is absent. To adapt the invention to this type of planter, it is simply necessary to transpose the bracket 15, carrying the lever 17, from the rear to the front side of the hopper and also to reverse the spout 8, so that the oblique lower end of said spout shall be adapted to be closed by the closure 19 of said lever. Instead, however, of providing the said lever with a friction-roller, as 23, or with a rounded end, as 30, the friction-roller is omitted, and the end of the lever is simply bifurcated, as at 22$^a$, the branches of the fork thus formed being disposed on opposite sides of the traction-wheel, which is designated 35. Said traction-wheel is provided with laterally-extending tappets 36, of which a plurality may be employed, so as to actuate the drop-lever at the desired intervals. The under side of the members or prongs 37, constituting the bifurcated end of the lever, may be concaved on their under sides, as shown at 38, so as to be more readily and effectively engaged by the laterally-extending tappets.

From the foregoing description, taken in connection with the drawings hereto annexed, the operation and advantages of my invention will be readily understood. The construction of my improved attachment is so extremely simple in its nature that it may be manufactured at a trifling cost. The principal members 15 and 17 may be made of wood, and said members are simply pivoted together by means of an ordinary pin or bolt, as will be readily seen. The sides of the lever member are provided with recesses 25 to admit of their insertion into the bifurcated lower end of the bracket 15. Said members 15 and 17 may be easily provided with mortises or seats for the spring. The roller 23 may be readily mounted at the rear end of the lever 17, and the tappets 18 may consist simply of wooden pegs driven into the wood of which the covering-roller is usually composed and beveled at their outer ends, so that they will unfailingly engage the roller 23 and operate the lever.

My improved device may be applied to planters and fertilizer-distributers of many different makes without in the least altering the construction thereof. I would have it understood, however, that I do not limit myself to the precise structural details herein set forth, but reserve the right to any changes, alterations, and modifications within the scope of my invention and whereby the device may be readily adapted to planters of different patterns and which may be resorted to without departing from the spirit or sacrificing the utility of the invention.

Having thus described my invention, I claim—

1. An attachment for planters and fertilizer-distributers, comprising a bracket and a lever pivotally connected and having inclined mortises in their inner adjacent sides, in combination with a flat U-shaped spring having its ends disposed in said inclined mortises.

2. The combination with a planter having a hopper provided with a spout, inclined at its lower end, of an attachment comprising a bracket connected detachably with the hopper, a lever connected pivotally with said bracket and forming a closure for the lower end of the hopper-spout, said lever being extended at its opposite end in the path of a rotary element of the planter, and tappets extending from such rotary element.

3. The combination with a planter having a hopper provided with a spout, inclined at its lower end, of an attachment comprising a bracket connected adjustably with the hopper, a lever connected pivotally with said bracket and forming a closure for the lower end of the hopper-spout, said lever and bracket being provided with inclined recesses in their adjacent sides, a U-shaped spring having its ends seated in said recesses, a roller mounted at the upper end of the lever which is extended in the path of a rotary element of the planter, and tappets extending from said rotary element to operate the lever.

4. In a planter having a hopper provided with a discharge-spout, a vibratory closure for said spout and a shield connected with the furrow-opener to deflect the discharge from the spout into the furrow.

In testimony that I claim the foregoing as my own I have hereto affixed my signature in the presence of two witnesses.

JOHN A. McCUTCHEN.

Witnesses:
R. J. BLAND,
L. I. PARROTT.